H. MONIER.
GAS BURNER.
No. 77,749. Patented May 12, 1868.
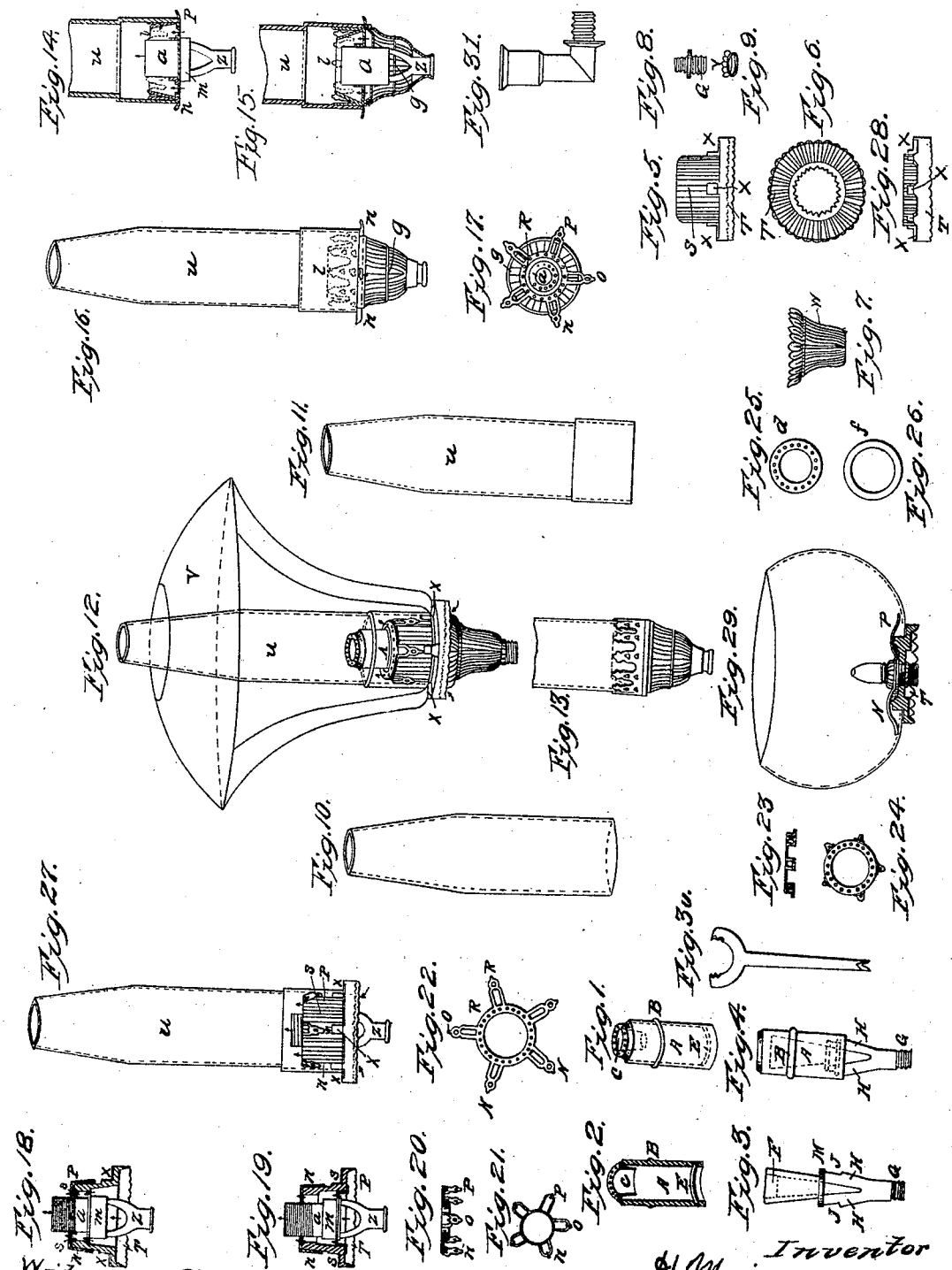
Witnesses:
Inventor
H. Monier
by F. A. Pollok, his atty

United States Patent Office.

HYPOLITE MONIER, OF PARIS, FRANCE.

Letters Patent No. 77,749, dated May 12, 1868

---

IMPROVEMENT IN GAS-BURNERS.

---

The Schedule referred to in these Letters Patent and making part of the same.

---

TO WHOM IT MAY CONCERN:

Be it known that I, HYPOLITE MONIER, of Paris, in the Empire of France, have invented a certain new and improved Burner for Gas and other Lighting-Apparatus; and I hereby declare the following to be a full, clear, and exact description of the same, reference being had to the accompanying drawings.

I make the burner in such manner that openings or draught-holes may be formed by means of two or several pieces of glass, or other suitable transparent material, fitted together face to face, having formed, throughout their length or width, openings or concavities, varying according to requirements. Thus, when the two plates or pieces of glass are brought together face to face, the openings or concavities in one plate will come opposite those in the other plate, thereby forming a series of draught-holes, or one plate only may have concavities, the other being plain, as may be desirable. I claim this improvement as applicable not only to my new gas-burner, but also to other gas-burners, for dividing the air into a number of small streams, and also to all kinds of burners for oil-lamps.

In the formation of the metallic portion of the burner, I prefer to employ an alloy, which, although fusible, can be employed in my gas-burners, because the heat produced is never high enough to melt the said alloy, in consequence of the new arrangements, and of the treble draught system introduced therein, and which is not used in other gas-burners or oil-lamp burners.

My new burner is composed, first, for the metallic parts, of an alloy of tin, lead, regulus, and copper, combined in certain proportions, hereinafter mentioned; second, for the tube and burner, of plastic porcelain, earthenware, and any refractory clay; third, for the draughting system, of glass or other vitrifiable and transparent materials, constructed and arranged to operate in connection with the other parts of the burner, in the manner hereinafter specified.

To enable those skilled in the art to understand and use my invention, I will now proceed to describe the manner in which the same is or may be carried into effect, by reference to the drawings accompanying and forming part of this specification.

Figure 1 is the tube, A, of the burner; it is formed of a refractory substance. The trunk of cone C is arranged so that the holes for the passage of gas may be bored between the external part A of the cylinder and the trunk of cone C. At about two-thirds of its height this tube is provided externally with a flange, B, and has at its base and internally, a groove, E, which may be seen in the section of the burner, Figure 2. The use of the flange B and of the groove E will be hereafter explained.

In the section, fig. 2, will be seen the position of the cone C, and the space between the said cone and the cylinder A, where the passage of gas takes place.

Figure 3 represents a burner, without an external tube; it is similar to the ordinary brass burners, except that it is rather longer, and that it is composed of tin, lead, and regulus, in the proportions of fifty-seven parts of tin, thirty-eight of lead, and five of regulus, for every one hundred parts.

I would remark that these proportions may be varied to a small extent, and that a small proportion of copper may be added. This alloy is very fusible, and could not be used in the manufacture of the ordinary burners, which give too great heat. The new arrangements introduced by me in the construction of gas-burners produce much less heat, and allow the use of that alloy; thus a very great advantage will be obtained in the manufacture, because the part of the burner which I call the fork, can be melted in a mould, from which it passes, already bored, and provided with an internal and external screw-thread, G. Its upper part, F, is formed in the shape of a hollow cone, where the burner, C, of the tube, A, will be introduced. The fork is also provided with a ring or shoulder, M, which enters the tube a little above the groove E.

When the fork has been so introduced in the tube, the base of the latter is covered with a suitable plastic compound, which enters the groove E, thereby forming an air-tight joint. The ring M holds the fork in proper position, and prevents its going down, whilst the bearings $jj$ prevent its penetrating too far in the interior of the tube A. The space between the internal cone C and the upper part of the fork F is likewise cemented, to prevent the passage of gas through it.

Figure 4 shows the fork and the tube connected together, and forming the burner.

Figure 22 is a ferrule, R, through which passes the tube A; it is bored with holes to divide the air into small streams necessary for the complete combustion of the gas. On its external circumference are five flexible branches, which can be bent at will, as shown in Figures 12 and 27.

Figure 20 is a ferrule, somewhat resembling the one above described, except that it has no holes, and that its side, R, directly clasps the tube A, this part being bent inward. Figures 20 and 21 represent this ferrule.

Figure 5 is a cone, S, made of glass, and having a large brim, T, upon which are small bearings, X, for the globe or chimney to stand upon; they allow the passage of the air between the brim T and the chimney or globe. The base of the cone S is indented as sockets generally are, and its interior is fluted, so that if any object be put under the brim T, or even internally, this object, although flat, would always leave some openings for the passage of the air.

Figure 6 is a plan of the same, and shows the grooves in the interior.

Figure 7 is a sort of glass tulip, W, the top of which is displayed and indented; it is put on the brim T, and it is through the openings produced by the concavities existing between the two sockets that the passage of the air takes place. It can be plain or fluted internally. This arrangement of the socket and of the cone S, replaces, with the same advantages, the boring of the baskets used in the ordinary gas-burners.

To put up this burner, it then suffices to take the already prepared tube, fig. 4, to introduce it in the opening R, figs. 20 or 22, to afterwards bend the branches N O P, on the glass cone S, fig. 5, and to put the tulip W underneath. As the screw-thread G, of the fork, passes beyond the tulip, all the pieces are fastened and tightened together by means of the small screw-nut y, Figure 9.

Figure 10 represents a chimney applicable to my system of glass burner. This chimney is cylindrical for two-thirds of its length, and conical for the remaining portion. I give to the chimney, fig. 10, a new form, represented in Figure 11, as follows: The lower part is wide and cylindrical, for about a fifth part of the total height, the remainder is like the preceding one. This modification will be hereinafter explained. The whole glass burner, with all its accessories, is represented in fig. 12.

I have placed, in its proper position, a new model of the glass globe, V, which may be made plain or with facets. The top is like a Chinese parasol or a parachute; it can be ground, enamelled, or silvered, to increase the reflection of the light; it can be supported by any other means than the one shown at fig. 12, and may be applied not only to any burner whatever, but to any street-lamp on a larger scale.

The upper opening may be covered with the cap of any ordinary lantern or window-lamp. This globe, which surrounds the chimney, is supported, as in my system of glass burners, by the globe-holder, X. A treble draught is then produced—firstly, one through the interior of the tube A, and coming from the interstices between the cone S and the indentations of the socket W; secondly, through the space between the cone and the tube, and coming from the same source; thirdly, between the chimney and the exterior of the cone, through the aforesaid support X, which is embossed on the brim T. The arrows indicate the current of the air.

Figure 28 is a portion of the cone S, more or less long, according to requirement, and principally serving to dispense with the globe-holders of the Manchester burners, and to apply the holders of my own invention by the means shown in figs. 8, 9, 22, and 28.

Figure 29 is the section of a Manchester burner, all set up, showing how the above-mentioned pieces can be applied to that burner.

I can also use, as will be explained, the device shown in fig. 28, or in fig. 5, to replace the basket; this change having the advantage of removing the shade, in ordinary brass burners and to oil-lamp burners, in which such device will serve as basket, globe-holder, &c., as may be seen in Figures 18 and 19, the description of which follows. Fig. 19 is a section of an ordinary brass burner, showing the internal arrangements. I apply to it the cone of the fig. 5, which is tinted in blue. I also apply to it the ferrules, fig. 20, tinted in red. The brass burner A is provided with a short screw-thread, to allow the ferrules to be screwed, and prevent the oscillation and rising up of the cone; likewise for the ferrules, shown in Figures 23 and 24, and fitted as is explained in fig. 18, tinted in yellow. The burner is thus prevented from sinking. The glass cone and the solidity of all the parts are then secured.

I, in certain cases, replace that ferrule by another, which is shown at Figure 25, also in section as the preceding one; it is not provided with branches, and rests against a projection on the interior of the cone S. This ferrule is tinted yellow. Should the top of the cone be too open, and the draught too strong, or too rapid, I remedy these inconveniences by putting a compact ferrule between the one screwed on the burner and the glass cone; it is tinted in carmine, and is represented by the letter F in Figure 26.

Figure 27 represents a burner set up in position with the triform chimney U.

I have hereinbefore spoken of two chimneys, represented in figs. 10 and 11. The first one can be easily applied to all my models of glass burners, but if I wish to apply it to ordinary gas-burners without removing the gallery L, as may be sometimes desirable, I am obliged to alter this chimney, so that instead of fitting into the gallery, as ordinary chimneys, it will surround the said gallery externally, which alteration consists in widening the chimney. But as the widening, if made in the whole length of the chimney, might cause some oscillation, I maintain the ordinary size, fig. 10, except for about one-fifth of its height at the bottom, which part is cylindrical, but wider than the rest. The middle is also cylindrical, but of a lesser diameter. The top, being about the third part of the whole height, is conical; whence I call it triform. It has the advantage over ordinary chimneys of not being so near the light, and consequently there is much less risk of its being broken and soiled.

Therefore, either on my glass burner or on any other gas-burner or oil-lamp burner, it will always surround the old galleries, of any shape whatever. It may be remarked that I place it so that it surrounds the gallery instead of fitting into it, as is done in the ordinary gas-burners, and then it is wider than the chimneys of ordinary burners, as shown at Figure 13, and its disposition is shown at Figure 16.

To introduce the chimney into the interior of the gallery, I should have been obliged to widen this gallery, which would have produced some shade, and I avoid this inconvenience by placing it outside the gallery, and in that case it could only serve for burners made purposely. But my system of triform chimneys, and the manner in which they are supported, as shown in Figures 14 and 15, will enable me to use them with most of the ordinary burners already existing, and to have them supported, if necessary, by the globe-holder, if there is any.

Figure 14 shows a burner without the basket, but with the gallery L. Between the latter and the edge, M, of the burner, the ferrule, fig. 22, is placed, tinted in yellow. It is then seen that the branches, N O P serve as chimney-holder and globe-holder, and that the gallery L is inside the chimney U.

Figure 15 represents another arrangement, where the burner z is made with its basket, g, and as the latter has no globe-holder, this absence has been remedied by providing the interior of the basket with a ferrule, R, resting on the brim M.

Care should be taken to cut, in the circumference of the basket, small notches, to facilitate the egress of the branches of the ferrule, which branches then sufficiently overreach to support the chimney and the globe. The ferrule is maintained by the gallery L, which presses against the brim M, and prevents its oscillation.

Figure 17 is a plan of the said arrangement.

Figure 16 shows the burner set up in position.

Figure 30 is a key, to screw and unscrew the burner; it is introduced through the aperture of the burner, and exercises its power between the branches of the fork H H.

Figure 31 represents an elbowed joint, like the ordinary ones, with the difference that it is made of fusible material, and is cast at one stroke, the others being of a harder substance.

It will be readily understood, without further explanation, that the improvements which have been above described in connection with gas-burners, can likewise be applied to oil-lamp or other like burners.

In conclusion, I would remark that there is no shade, no oxidation; there is less vacillation of the light, hence less fatigue to the eyes; a softer light, and a better appearance and cleanliness; an increase of light, and a decrease of caloric; lastly, a notable and undeniable economy.

Having now described my invention, and the manner in which the same is or may be carried into effect, what I claim, and desire to secure by Letters Patent, is—

1. The combination, with a gas or other burner, such as herein described, of an internally-fluted cone or chimney-rest, of glass or other transparent material, surrounding the same, and a cap, R, or its equivalent, the whole being constructed and arranged as specified, so that air shall pass to the flame through the interior of the burner, between the burner and the cone, and between the cone and the chimney, as and for the purposes set forth.

2. The combination, with the burner, of the internally-fluted glass cone and chimney-seat, and the corrugated and fluted glass tulip, applied to the said cone, in the manner and for the purposes shown and specified.

HYPO. MONIER.

Witnesses:
   E. PETIT
   GROSJEAN.